(12) United States Patent
Seitz et al.

(10) Patent No.: US 10,100,692 B2
(45) Date of Patent: Oct. 16, 2018

(54) DEVICE FOR METERING FLUID

(71) Applicant: Robert Bosch GmbH, Stuttgart (DE)

(72) Inventors: Ansgar Seitz, Neuhausen (DE); Franz Thoemmes, Bletigheim-Bissingen (DE); Dieter Etzel, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 14/779,068

(22) PCT Filed: Mar. 26, 2014

(86) PCT No.: PCT/EP2014/056085
§ 371 (c)(1),
(2) Date: Sep. 22, 2015

(87) PCT Pub. No.: WO2014/154763
PCT Pub. Date: Oct. 2, 2014

(65) Prior Publication Data
US 2016/0053650 A1    Feb. 25, 2016

(30) Foreign Application Priority Data
Mar. 26, 2013   (DE) .......................... 10 2013 205 309

(51) Int. Cl.
*F16K 49/00*      (2006.01)
*F01N 3/20*       (2006.01)
(Continued)

(52) U.S. Cl.
CPC .............. *F01N 3/2066* (2013.01); *F16K 1/32* (2013.01); *F16K 31/0655* (2013.01);
(Continued)

(58) Field of Classification Search
CPC .............. F01N 3/2066; F01N 2610/11; F01N 2610/02; F16K 49/005; F16K 31/0655; F16K 1/32; Y02T 10/24
(Continued)

(56) References Cited

U.S. PATENT DOCUMENTS

| | | | | |
|---|---|---|---|---|
| 2,157,480 A | * | 5/1939 | Cole | .................. F02M 51/0685 |
| | | | | 137/334 |
| 6,192,677 B1 | * | 2/2001 | Tost | ................... B01D 53/9431 |
| | | | | 60/286 |

(Continued)

FOREIGN PATENT DOCUMENTS

| CN | 101131211 A | 2/2008 |
|---|---|---|
| CN | 102102613 A | 6/2011 |

(Continued)

OTHER PUBLICATIONS

International Search Report for Application No. PCT/EP2014/056085 dated Apr. 29, 2014 (English Translation, 2 pages).

*Primary Examiner* — R. K. Arundale
(74) *Attorney, Agent, or Firm* — Michael Best & Friedrich LLP

(57) ABSTRACT

The invention relates to a device for metering fluid, particularly for the metered injecting of a reduction agent into the exhaust tract of an internal combustion engine, which has an electrically controllable metering valve (11) having a valve housing (16), having an inlet opening and a metering opening (14, 15) for the fluid, and a cooling module (12) to which a coolant is applied for cooling the metering valve. In order to achieve a permanent fording ability of the device, the metering valve (11) is hermetically sealed in the cooling module (12) and only the inlet opening and the metering opening (14, 15) of the valve housing (13) are exposed.

10 Claims, 2 Drawing Sheets

(51) Int. Cl.
*F16K 1/32* (2006.01)
*F16K 31/06* (2006.01)

(52) U.S. Cl.
CPC ........ *F16K 49/005* (2013.01); *F01N 2610/02* (2013.01); *F01N 2610/11* (2013.01); *Y02T 10/24* (2013.01); *Y10T 137/6416* (2015.04)

(58) Field of Classification Search
USPC ........... 239/132.3, 132.1, 132; 137/340, 334, 137/338, 339, 625.46, 625.47; 422/172
See application file for complete search history.

(56) References Cited

U.S. PATENT DOCUMENTS

| | | | |
|---|---|---|---|
| 6,539,708 B1* | 4/2003 | Hofmann | B01D 53/8631 239/132.3 |
| 2007/0235086 A1* | 10/2007 | Hornby | F02M 51/0671 137/334 |
| 2007/0290070 A1* | 12/2007 | Hornby | F01N 3/035 239/132.3 |
| 2008/0148717 A1* | 6/2008 | Ohshima | F01N 3/2066 60/295 |
| 2013/0228231 A1* | 9/2013 | Nagel | F01N 3/2066 137/334 |
| 2014/0054394 A1* | 2/2014 | Bugos | F01N 3/10 239/132.3 |

FOREIGN PATENT DOCUMENTS

| | | |
|---|---|---|
| CN | 102705560 A | 10/2012 |
| DE | 102010030920 | 1/2012 |
| DE | 102011075381 | 11/2012 |
| DE | 102011078504 | 1/2013 |
| JP | S56161870 A | 12/1981 |
| JP | H09182913 A | 7/1997 |
| JP | 2008151087 A | 7/2008 |
| JP | 2009138627 A | 6/2009 |

\* cited by examiner

DEVICE FOR METERING FLUID

BACKGROUND OF THE INVENTION

The invention relates to a device for metering fluid, particularly for the metered injecting of a reduction agent, such as a urea-water solution, into the exhaust tract of an internal combustion engine.

In a known device comprising a dosing or metering valve and cooling module (DE 10 2010 030 920 A1), the cooling module has a sleeve which is multi-stepped in the diameter thereof. An annular channel comprising an inlet and an outlet for a coolant, preferably water, flowing through the annular channel is arranged on one sleeve section thereof. The dosing or metering valve has a tubular valve housing, which is closed off by a valve seat body at the end thereof. The valve seat body contains an injection or metering opening and a valve seat enclosing said opening. The valve seat interacts with a valve member for exposing and closing the valve opening, said valve member being electromagnetically actuated and acted upon by a valve closing spring. A magnet housing of the electromagnet is fixed to the valve housing with a housing section that is smaller in diameter and receives a solenoid that is seated on the valve housing in a section that is larger in diameter. The section of the magnet housing which is larger in diameter is overlapped by a plastic sheathing, which is produced by extrusion coating a housing section of the valve housing on the inlet side in a region facing away from the section which is smaller in diameter. The dosing or metering valve is inserted into the sleeve of the cooling module such that the end of the valve housing on the metering side enters into a sleeve section having the smallest inside diameter; and the sleeve section having the largest inside diameter overlaps the plastic sheathing. In order to seal the interior of the sleeve, a sealing ring made from elastomer is inserted between the plastic sheathing and the sleeve section having the largest diameter; and the sleeve section having the smallest diameter is welded to the valve housing at the end of said valve housing which projects above the valve seat body.

SUMMARY OF THE INVENTION

The device according to the invention for metering fluid has the advantage that, as a result of intensive, total cooling of the metering valve, said metering valve can tolerate without damage thereto high temperatures of the fluid of, e.g., 110° C. and of the surroundings of, e.g., 200° C. and is completely protected from the ingress of splash water and therefore meets the demands of the fording ability or the immersion reliability thereof, which is not the case for the known metering device. In comparison to the known metering device, the cost intensive plastic extrusion coating of the valve housing in order to produce the plastic sheathing is omitted, and any elastomer seals between the metering valve and the cooling module can be omitted. In so doing, manufacturing costs are lowered and leakage problems are also avoided which occur as a result of ageing of the elastomer seals at high temperatures and under the influence of aggressive fluid, such as, e.g., a urea-water solution.

According to one advantageous embodiment of the invention, the cooling module has a module housing comprising a housing inlet which exposes the inlet opening of the valve housing and a housing outlet which exposes the metering opening of the valve housing as well as a cooling jacket extending between the housing inlet and the housing outlet and comprising an inlet and outlet for the coolant. The intensive cooling of the entire metering valve enclosed in the module housing is achieved by means of the cooling jacket of the cooling module which thus extends practically over the entire valve housing; and all valve components, in particular the electrical components, such as an electrical actuator for controlling the valves, are very well protected from overheating due to the fluid flowing through the valve housing as well as to the high ambient temperatures at the installation point, such as in the exhaust tract of the internal combustion engine. Water is preferably used as the coolant that flows through the cooling jacket.

According to one advantageous embodiment of the invention, the module housing has a hollow cylindrical housing body equipped with the housing jacket, a housing base integrally connected to the housing body and a housing cover which closes off the housing body and is hermetically connected to the housing body in a materially bonded manner, e.g. by means of a circumferential welded seam. The housing inlet is formed in the housing cover and the housing outlet in the housing base. The housing end of the valve housing on the inlet side rests against the housing cover such that the inlet opening is congruent to the housing inlet; and the housing end of the module housing on the metering side enters into the housing outlet in the housing base of the module housing. The valve housing is hermetically connected respectively to the housing cover and the housing base of the module housing in a materially bonded manner in each case, e.g. by means of a circumferential welded seam. A simple installation is achieved by means of this design of the module housing and the arrangement of the valve housing in the module housing, wherein the materially bonded connections between module housing and valve housing ensure an absolutely hermetically sealed enclosure of the valve housing so that no splash water or water can ingress into the module housing containing the metering valve. The device is thus waterproof both when crossing or being immersed in water independently of the installation position thereof.

According to one advantageous embodiment of the invention, the housing base has a conical shape, which tapers towards the housing outlet and comprises an integrally formed base collar that encompasses the housing outlet, and the housing cover has a hood shape comprising a hood base containing the housing inlet and a hood jacket, wherein the materially bonded connections of the valve housing to the module housing on the base collar and on the hood base are each carried out circumferentially. In connection with the arrangement of the inlet and outlet for the coolant on the cooling jacket in the proximity of the housing cover of the module housing, a favorable installation configuration of the device is achieved for installation, for example, in the exhaust tract of an internal combustion engine. According to one advantageous embodiment of the invention, at least the housing end of the valve housing on the metering side is designed as a valve pipe which is closed off by a valve seat body containing the valve opening. The valve seat body is connected to the valve housing in a materially bonded manner, and the circumferential, materially bonded connection of the valve housing to the base collar integrally formed on the housing base of the module housing is carried out in the fluid flow direction downstream of the materially bonded connection of the valve seat body to the valve pipe. This has the advantage that the production of the materially bonded connection between the base collar and the valve housing does not have a harmful retroactive effect on the valve function.

According to one advantageous embodiment of the invention, the valve housing is supported radially on the module housing by a supporting body. This increases the resistance to vibration and the robustness of the device and also makes said device suitable for use in rough operational modes.

According to one advantageous embodiment of the invention, the supporting body is produced from a good heat conducting material. As a result, the heat transferred from the fluid to the metering valve can be very quickly led off to the cooling jacket and the metering valve is reliably protected from overheating.

According to one advantageous embodiment of the invention, the metering valve has an electrical actuator for actuating a valve member controlling the metering opening and an electrical connection cable that leads away from the actuator and is led out of the module housing via a leak-proof cable feedthrough disposed in the housing cover of said module housing. The cable feedthrough is preferably made from a protective sleeve which is slid onto the connection cable by means of a press fit, said sleeve being pressed into a wall opening formed in the housing cover. This has the advantage that the plug connection, which connects the connection cable to an electrical power feed, can be laid away from the device in regions with a cooler ambient temperature. The supporting body consisting of good heat conducting material on the valve housing is advantageously disposed in the region of the electrical actuator because the electrical components can thus be cooled down particularly well.

BRIEF DESCRIPTION OF THE DRAWINGS

The invention is explained in detail in the following description with the aid of an exemplary embodiment depicted in the drawings. In the drawings.

DETAILED DESCRIPTION

Figure 1:
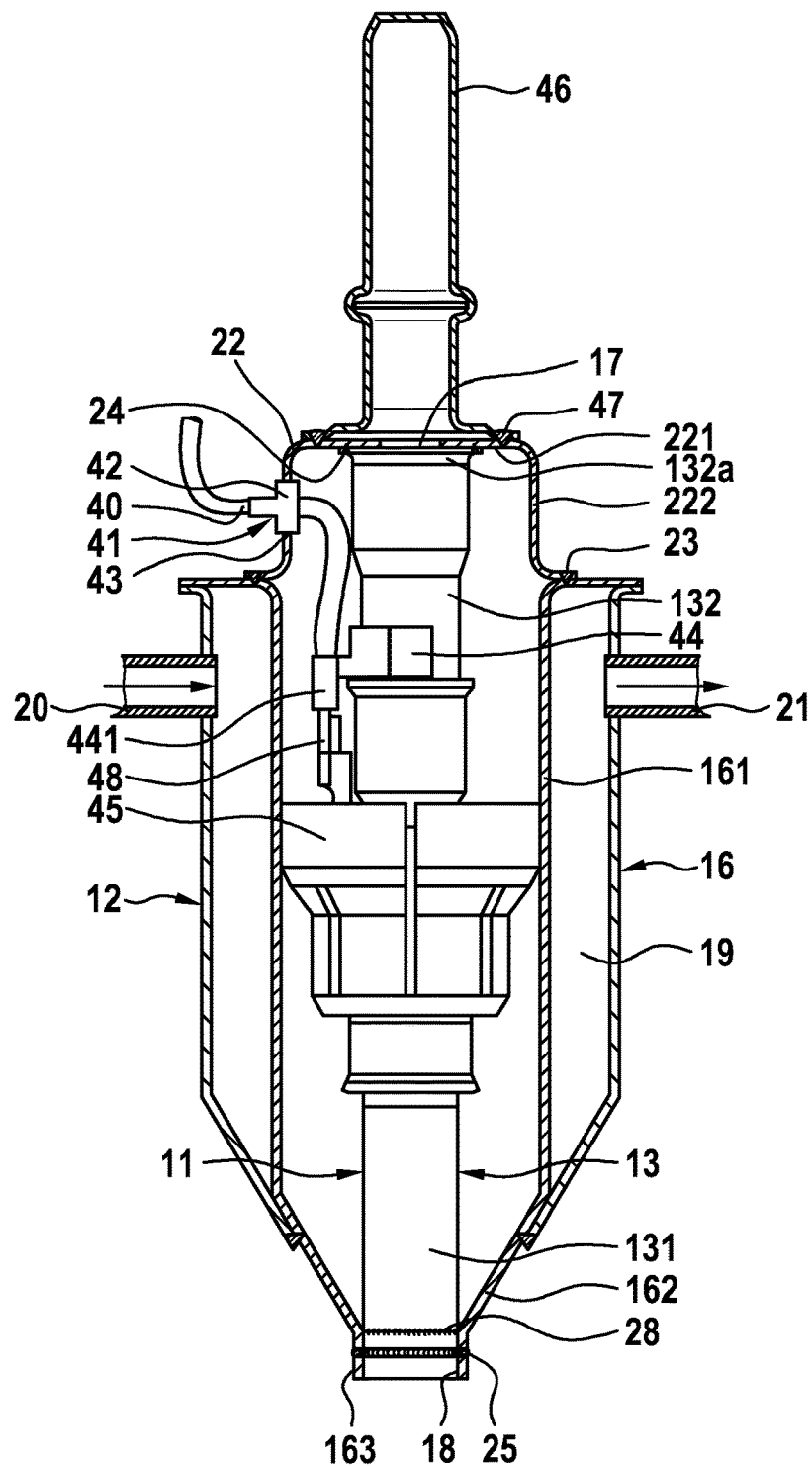
FIG. 1 shows a side view of a device for metering fluid comprising a metering valve and a cooling module depicted in longitudinal section.

The device depicted in FIG. 1 for metering fluid is preferably used for the metered injection of a reduction agent, e.g. a urea-water solution, into the exhaust tract of an internal combustion engine for the purpose of reducing the nitrogen oxides in the exhaust gas. The device has an electrically controllable metering valve 11 and a cooling module 12 to which a coolant, preferably water, is applied for cooling the metering valve 11.

Figure 2:
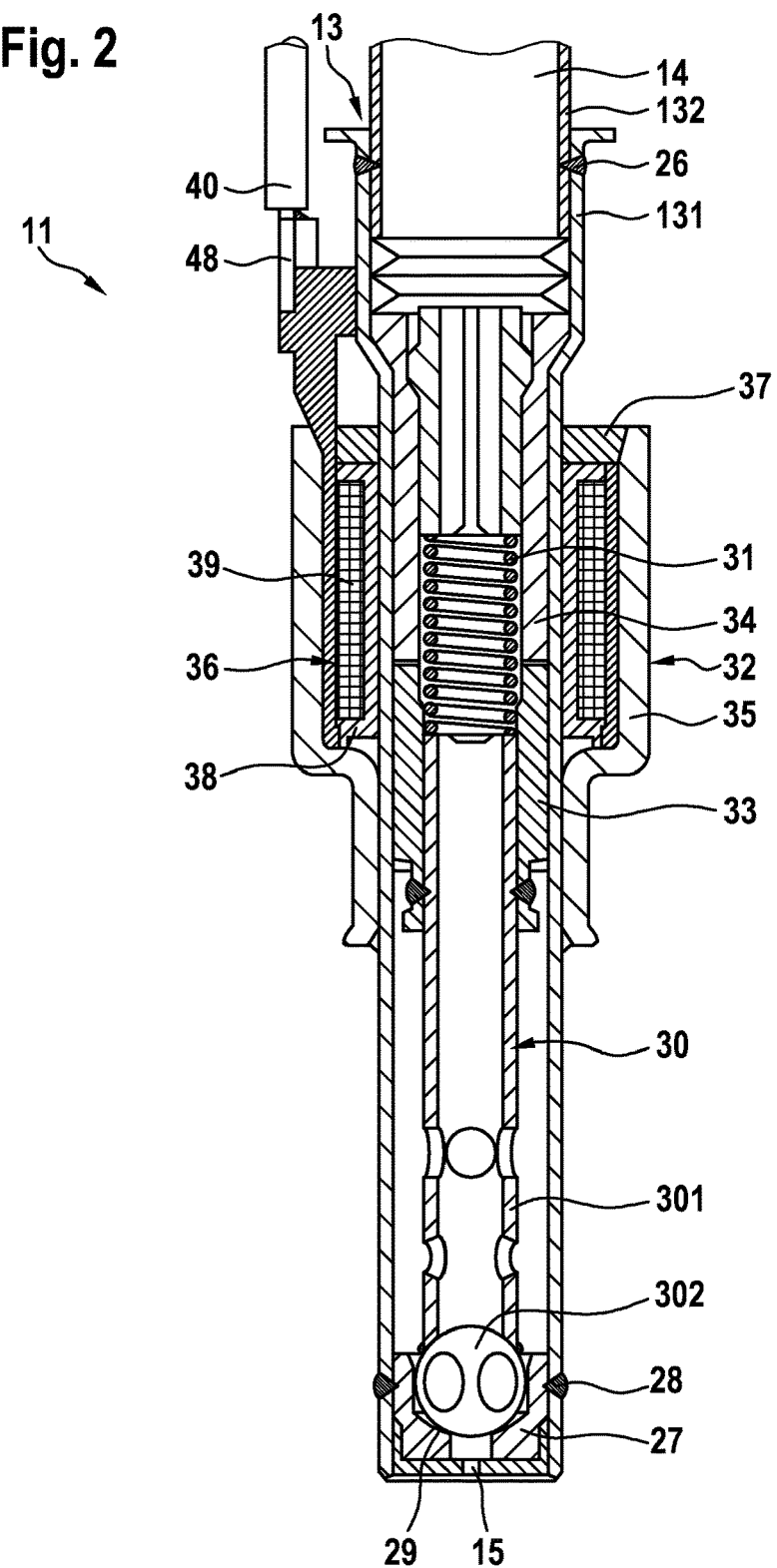
FIG. 2 shows a partial longitudinal section of the metering valve in FIG. 1.

The metering valve 11 depicted in a side view in FIG. 1 and in longitudinal section in FIG. 2 comprises a valve housing 13 having an inlet opening 14 and a metering opening 15 for the fluid (FIG. 2) and is hermetically sealed in the cooling module 12, wherein only the inlet opening 14 and the metering opening 15 of the valve housing 13 are exposed towards the outside. To this end, the cooling module 12 has a module housing 16 comprising a housing inlet 17 exposed to the inlet opening 14 of the valve housing 13 and a housing outlet 18 exposed to the metering opening 15 of the valve housing 13 as well as a cooling jacket 19 which extends between the housing inlet 17 and the housing outlet 18 and comprises an inlet 20 and an outlet 21 for the coolant. The module housing 16 consists of two parts and comprises a hollow cylindrical housing body 161, which is equipped with the cooling jacket 19 and is closed off by a housing base 162 that is integrally formed with the housing body 161, and a housing cover 22 which covers the end face of the housing body 161 facing away from the housing base 162 and is connected to the housing body 161 in a materially bonded manner. The materially bonded connection is, e.g., produced by means a circumferential welded seam 23 on the housing cover 22. The housing inlet 17 is formed in the housing cover 22 and the housing outlet 18 in the housing base 162. The inlet and outlet 20, 21 in the cooling jacket 19 lie in the proximity of the housing cover 22.

The valve housing 13 rests with the inlet-side housing end thereof against the housing cover 22 of the module housing 16 such that the inlet opening 14 of said valve housing is congruent to the housing inlet 17 of said module housing. The valve housing 13 also enters with the metering-side housing end thereof into the housing outlet 18 disposed in the housing base 162 of the module housing 16. Said valve housing 13 is connected respectively to the housing cover 22 and the housing base 162 in a materially bonded manner. The circumferential welded seams 24 and 25 produced, e.g., by welding each result in a hermetically sealed connection between valve housing 13 and module housing 16. The housing base 162 has a conical shape which tapers towards the housing outlet 18 and comprises a base collar 163 that is integrally formed therewith and encompasses the housing outlet 18, whereas the housing cover 22 has a hood shape comprising a hood base 221 containing the housing inlet opening 17 and a hood jacket 222 aligned with the hollow cylindrical housing body 161, such that the materially bonded connection of the module housing 16 to the valve housing 13 lies on the housing cover 22 (welded seam 24) in the hood base 221 and on the housing base 162 (welded seam 25) in the base collar 163.

In the case of the metering valve 11 shown here, the valve housing 13, as can be seen from the sectional depiction according to FIG. 2, consists of a valve pipe 131 and a sleeve 132 inserted into the valve pipe 131, which is connected to said valve pipe 131 in a materially bonded manner, e.g. by means of a circumferential welded seam 26. The sleeve 132 comprises the inlet opening 14 of the valve housing 13, which opening is surrounded by a sleeve flange 132a (FIG. 1), and forms the housing end on the inlet side. The metering-side housing end of the valve housing 13 formed by the valve pipe 131 is closed off by a valve seat body 27 which is connected to the valve housing 13 respectively to the valve pipe 131 in a materially bonded manner, e.g. by means of a circumferential welded seam 28, so as to be impermeable to fluids. The metering opening 15 is formed in the valve seat body 27 and is surrounded by a valve seat 29. A valve member 30 works together with the valve seat 29 to close and expose the metering opening 15. The valve member 30 comprises a hollow cylindrical valve needle 301 and a closing head 302 which closes off the valve needle 301 and is pressed against the valve seat 29 by means of a valve closing spring 31 that acts upon said valve needle 301. An electrical actuator designed here as an electromagnet 32 is used to actuate the valve member 30 against the restoring force of the valve closing spring 31. The electromagnet 32 comprises in a known manner an armature 33, which is connected to the valve needle 301, is moved axially in the valve pipe 131 and with a magnet core 34 fixed in the valve pipe 131 encloses a working air gap; a solenoid 36 seated on the valve pipe 131, a magnet pot 35 for receiving the solenoid 36, which pot is fastened on the valve pipe 131 with a pot section that is smaller in diameter, and a magnetic yoke 37 which forms a back iron. The solenoid 36 has a solenoid or exciter winding 39 wound on a coil body 38 and connected to an electrical connection cable 40. The electrical and mechanical connection is carried out at a connection point 48 lying outside of the magnet pot 35 by means of soldering, welding or crimping. As can be seen in FIG. 1, the connection cable 40 exits the module housing 16 via a hermetically sealed cable feedthrough 41 disposed in the housing cover 23, wherein the cable feedthrough 41 has, for example, a protective sleeve 42 made of elastomer which is slid onto the connection cable 40 by means of a press fit and is inserted in a wall opening 43 present in the hood jacket 222.

In order for the device to achieve a sufficient resistance to vibration, the connection cable 40 is radially supported in a cable section between the connection point 48 and the cable feedthrough 41 by a cable holder 44 on the valve housing 13. The cable holder 44 is, e.g., designed as a clip which is mounted to the sleeve 132 of the valve housing 13. The clip is injection molded with an integrally formed sleeve 441 to the connection cable 40. In addition, the valve housing 13 is supported radially on the module housing 16 respectively on the hollow cylindrical housing body 161 by means of a supporting body 45. The supporting body 45 is preferably clamped onto the magnet pot 35 fixed on the valve housing 13 respectively the valve pipe 131. In order to achieve a fast heat dissipation from the metering valve 13 heated by the hot fluid, in particular from the electrical components of said metering valve, the supporting body 45 preferably consists of a very good heat conducting material.

In order to connect the device to a fluid supply line, a connection piece 46 enclosing the housing inlet 17 of the module housing 16 is placed on the housing cover 22 of the module housing 16 and is connected in the region of the hood base 221 in a materially bonded manner to the housing cover 22, e.g. by means of a circumferential welded seam 47.

The device is assembled as follows:

The completely preassembled metering valve 11 is initially provided with the housing cover 22 of the module housing 16 by the hood-shaped housing cover 22 being placed with the hood base 161 thereof onto the sleeve 132 of the valve housing 13 and sleeve flange 132a and hood base 221 being connected to one another in a materially bonded manner (welded seam 24), wherein the inlet opening 14 in the valve housing 13 and the housing inlet 17 in the hood base 221 are congruent with each other. The connection cable 40 comprising the protective sleeve 42 that has be slid thereon is, e.g., soldered to the connecting ends of the solenoid 36 (connection point 48 in FIG. 2) and the protective sleeve 42 is inserted into the wall opening 43 in the hood jacket 222 (FIG. 1). In the event of a cable holder 44 being optionally present, said cable holder is clipped onto the sleeve 132 of the valve housing 13. The connecting piece 46 is placed on the hood base 221 of the housing cover 22 coaxially with respect to the sleeve 132 such that the housing inlet 17 in the hood base 221 is covered, and the materially bonded connection between connection piece 46 and hood base 221 is produced (welded seam 47). In the event of a supporting body 45 being optionally present, said supporting body is clamped to the magnet pot 35. The metering valve 11 equipped in this manner is axially inserted into the hollow cylindrical housing body 161 of the module housing 16 that carries the cooling jacket 19 until the hood jacket 222 of the housing cover 22 abuts against the housing body 161 and the metering-side housing end of the metering valve 11 enters into the base collar 163 integrally formed on the housing base 162 of the module housing 16. The materially bonded connection is now produced on the one hand between the hood jacket 222 and the hollow cylindrical housing body 161 (welded seam 23) and on the other hand between the valve pipe 131 of the valve housing 11 and the base collar 163 at the housing base 162 of the module housing 16 (welded seam 25). In order not to impair the valve function when producing the materially bonded connection between valve housing 13 and base collar 163 (welded seam 25 in FIG. 1), said connection is carried out, as seen in the fluid flow direction, downstream of the connection between valve housing 13 respectively valve pipe 131 and valve seat body 27 (welded seam 28 in FIG. 1).

A hermetically sealed unit is to be formed by establishing the materially bonded connection between valve housing 13 and base collar 163 of the module housing 16 by means of the welded seam 25. Because the housing body 161 of the module housing 16 as well as the valve pipe 131 relate to deep-drawn parts, they are afflicted with relatively large diameter tolerances so that the possible play between the two parts: valve pipe 131 and housing body 161 can be too large to guarantee the desired seal weld with the welded seam 25. For that reason, the metering valve 11 is first mounted in the housing body 161 of the cooling module 12 according to the invention. The possible play between the two components, resulting from too large of diameter deviations, is subsequently checked. If the diameter deviations and therefore the play present between the valve pipe 131 and the housing body 161 lie above a defined limit value, the valve pipe 131 is then widened from the inside at the downstream valve tip of the metering valve 11 using a calibration tool that is not shown, whereby the weld gap is reduced to a desired minimum. As a result of the widening process, the valve pipe 131 of the metering valve 11 is optimally adapted to the existing diameter of the base collar 163 of the module housing 16. In this way, it is assured that the hermetic seal weld can be reliably made. Any further expensive rework or mating costs, which would otherwise occur when the diameter deviations between valve pipe 131 and module housing 16 are too great, are thus avoided in an advantageous manner.

What is claimed is:

1. A device for metering fluid, comprising an electrically controllable metering valve (11) having a valve housing (13) comprising an inlet opening and a metering opening (14, 15) for the fluid and a cooling module (12) to which a coolant is applied for cooling the metering valve (11), characterized in that the metering valve (11) is hermetically sealed in the cooling module (12) and only the inlet opening and the metering opening (14, 15) of the valve housing (13) are exposed to the outside of the cooling module, wherein the cooling module (12) has a module housing (16) comprising a housing inlet (17), which exposes the inlet opening (14) of the valve housing (13), and a housing outlet (18), which exposes the metering opening (15) of the valve housing (13), as well as a cooling jacket (19) which extends between the housing inlet (17) and the housing outlet (18) and comprises an inlet and an outlet (20, 21) for the coolant, wherein the module housing (16) comprises a hollow cylindrical housing body (161) equipped with the cooling jacket (19), a housing base (162) integrally formed with the housing body (161) and a housing cover (22) which closes off the housing body (161) and is connected to said housing body (161) in a materially bonded manner; in that the housing inlet (17) is disposed in the housing cover (22) and the housing outlet (18) is disposed in the housing base (162); and in that a housing end of the valve housing (13) on an inlet side rests against the housing cover (22) such that the inlet opening (14) is congruent to the housing inlet (17) and the housing end of the valve housing (13) on a metering side enters into the housing outlet (18) in the housing base (162) of the module housing (16) and in that the valve housing (13) is connected respectively to the housing cover (22) and the housing base (162) of the module housing (16) in a materially bonded manner, and wherein the housing base (162) of the housing module (16) has a conical shape which tapers towards the housing outlet (18) and comprises an integrally formed base collar (163) that encompasses the housing outlet (18); and the housing cover (22) comprises a hood base (221), which contains the housing inlet (17) of the module housing (16), and a hood jacket (222); and the materially bonded connection of the valve housing (13) to the module housing (16) is carried out in each case circumferentially at the base collar (163) and at the hood base (221).

2. The device according to claim 1, characterized in that at least the housing end of the valve housing (13) on the metering side is designed as a valve pipe (131) which is closed off by a valve seat body (27) containing the metering opening (15) and is connected to the valve seat body (27) in a materially bonded manner; and in that the circumferential, materially bonded connection of the valve housing (13) to the base collar (163) integrally formed on the housing base (162) of the module housing (16) lies in a fluid flow direction downstream of the materially bonded connection of the valve seat body (27) to the valve housing (13).

3. The device according to claim 1, characterized in that the housing end of the valve housing (13) on the inlet side is a sleeve (132) comprising the inlet opening (14) and a sleeve flange (132a) which encompasses the inlet opening (14) and on which the circumferential, materially bonded connection to the housing cover (22) is carried out.

4. The device according to claim 1, characterized in that the valve housing (13) is supported radially in the module housing (16) by means of a supporting body (45).

5. The device according to claim 4, characterized in that the supporting body (45) consists of a heat conducting material.

6. The device according to claim 1, characterized in that the metering valve (11) has an electrical actuator for actuating a valve member (30) controlling the metering opening (15) and an electrical connection cable (40) leading away from the actuator; and in that the connection cable (40) is led out of the module housing (16) by a leak-proof cable feedthrough (41) disposed in the housing cover (22) of the module housing (16).

7. The device according to claim 6, characterized in that the cable feedthrough (41) has a protective sleeve (42) which is made of elastomer and is slid onto the connection cable (40) by a press fit, said protective sleeve being inserted into a wall opening (43) formed in the hood jacket (222) of the housing cover (22).

8. The device according to claim 6, characterized in that the connection cable (40) is supported in a cable holder (44) which is mounted on the valve housing (13).

9. The device according to claim 6, characterized in that the electrical actuator is an electromagnet (32) comprising a magnet pot (35) that is fixed on the valve housing (13) and a solenoid (36) that is accommodated in the magnet pot (35) and is connected to the connection cable (40), and in that the supporting body (45) is disposed on the magnet pot (35).

10. The device according to one claim 1, characterized in that a connection piece (46) that encompasses the housing inlet (17) is placed on the housing cover (22) and is connected to said housing cover (22) in a materially bonded manner.

* * * * *